United States Patent [19]
Blair

[11] Patent Number: 4,770,417
[45] Date of Patent: Sep. 13, 1988

[54] METHOD AND APPARATUS FOR CONTROLLING A BOWLING BALL LIFT MECHANISM

[76] Inventor: Alfred Blair, 19 Burnett Ave., Bayshore, N.Y. 11716

[21] Appl. No.: 120,100

[22] Filed: Nov. 13, 1987

[51] Int. Cl.⁴ ............................................. A63D 5/02
[52] U.S. Cl. ..................................... 273/49; 318/484; 361/196
[58] Field of Search .................... 273/43 R, 43 A, 49; 318/484; 361/196

[56] References Cited

U.S. PATENT DOCUMENTS

| | | | |
|---|---|---|---|
| 2,417,092 | 3/1947 | Smith | 273/50 |
| 2,664,290 | 12/1953 | Swift | 273/50 |
| 2,852,765 | 9/1958 | Dumas | 273/50 X |
| 3,094,328 | 6/1963 | Neville, Jr. et al. | 273/49 |
| 4,140,220 | 2/1979 | Hazeltine et al. | 209/580 |
| 4,350,337 | 9/1982 | Knauer et al. | 273/43 A X |
| 4,378,114 | 3/1983 | Sargent | 273/11 C |
| 4,724,506 | 2/1988 | Isawa | 273/43 R X |

FOREIGN PATENT DOCUMENTS 1396117  6/1975  United Kingdom .

Primary Examiner—Anton O. Oechsle
Attorney, Agent, or Firm—Leonard Belkin

[57] ABSTRACT

Method and apparatus for controlling and operating the return ball lift mechanism in a bowling alley. In a preferred embodiment the motor which drives the lifting belt is normally inoperative and it is actuated when a ball arrives to be lifted into the storage rack. A photo detector is utilized to detect the presence of the returning ball and provision is made to actuate the motor for a total of four seconds. In the event a second ball arrives before the end of four seconds, timing begins all over again. A feature of the invention is the elimination of a centrifugally operated switch to control the START winding of the motor as a solid state timer controls the operation of both windings of the motor.

10 Claims, 1 Drawing Sheet

U.S. Patent　　　Sep. 13, 1988　　　4,770,417
FIG. 1
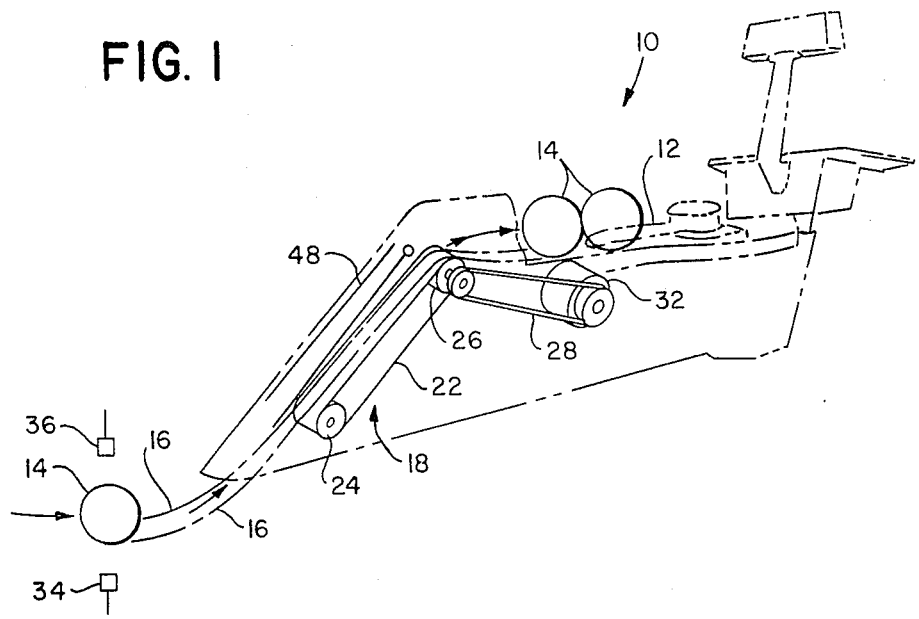
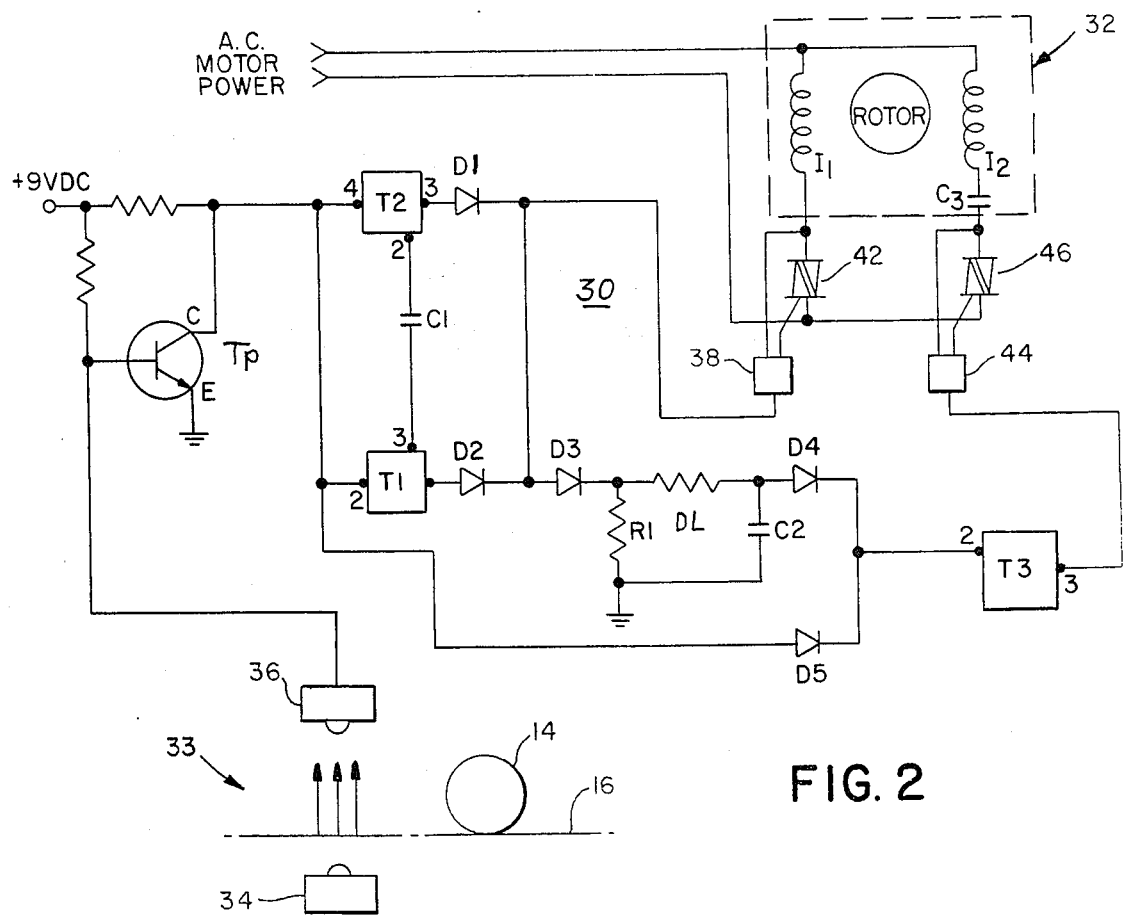
FIG. 2

METHOD AND APPARATUS FOR CONTROLLING A BOWLING BALL LIFT MECHANISM

BACKGROUND OF THE INVENTION

This invention relates to method and apparatus for the control of a ball lift mechanism used in bowling alleys.

In a typical bowling alley, returning balls are lifted up to be placed in a position which is within convenient reach of the players. This is generally accomplished by providing a continuously moving belt driven by an electric motor at each alley. In most bowling alleys, the belt is continually driven as long as the bowling alley is open for business, while in some situations the belt may be driven when the particular alley is in use.

In either type of situation, since the average time required to lift a ball is no more that four seconds, it can readily be seen that a large amount of electrical power is being used to keep the belts driven when not even needed. In addition to costs in terms of power usage, the motor, the drives, the belts, etc. are continuously in use with the result that maintenance and repair costs with consequent down time is an important cost consideration in the operation of a bowling alley.

A variety of systems have been developed for accelerating returning bowling balls, detecting fouls by players, and similarly related control systems. Examples of these are shown in British Pat. No. 1,396,117 and U.S. Pat. Nos. 2,417,092, 2,664,290, 2,852,765, 4,140,220, and 4,378,114. None of the preceding patents teach any system which can be useful in controlling the operation of the ball lifting mechanism in accordance with the principles of this invention.

SUMMARY OF THE INVENTION

The present invention provides a system for controlling the operation of the ball lifting belt drive mechanism in which the drive is energized only when its operation is required by an approaching ball and utilizes a solid state timer to control the start winding of the motor driving the belt instead of the usual centrifugal clutch switch that normally controls the winding.

In accordance with a preferred embodiment of this invention, there is provided a control system in a ball lift mechanism for the ball return chute of a bowling alley having a continuous belt interconnecting a pair of pulleys for lifting each returning ball and an induction motor with a capacitor start having a run winding and a start winding for driving said pulleys. The control system includes a light sensitive device for detecting the approach of a returning ball and producing a trigger signal, and a pair of running timers or clocks to activate the run winding of the motor. This causes an opto-isolator to produce a first activation signal, for a first triac which energizes the run winding. A starting timer or clock is provided for the start winding, utilizing a second opto-isolator and triac to energize the start winding of the motor. An inhibit signal is employed to prevent retriggering of the starting timer while the motor is running. Provision is included to restart the running timers when a successive ball approaches while a preceding ball is being lifed.

It is thus a principal object of this invention to provide a control system for a bowling ball lift mechanism which is operable only when required.

Other objects and advantages of this invention will become obvious from the following detailed description of preferred embodiments of this invention.

BRIEF DESCRIPTION OF THE FIGURES

FIG. 1 is a partially schematic view of a typical returning bowling ball lift mechanism to which this invention relates.

FIG. 2 is a schematic of a preferred embodiment of this invention.

DETAILED DESCRIPTION OF THE PREFERRED EMBODIMENTS

Referring to FIG. 1 there is illustrated a typical lift assembly 10 for returning bowling balls now in use in bowling alleys. Assembly 10 consists of a ball rack 12 on which balls 14 collect after being raised, a pair of spaced returning rails 16 on which balls 14 ride while returning, and a lift mechanism 18 to raise balls 14 for assembling on rack 12. Mechanism 18 consists of a continuous belt 22 wrapped around a pair of pulleys 24 and 26 driven by a belt drive 28 from motor 32 to pulley 26. A stationary strap 48 is provided for braking purposes.

In the operation of the assembly 10 just described, when ball 14 on parallel, spaced rails 16 returning by gravity makes contact with moving belt 18 it is raised by the latter and deposited on rack 12. As previously described, mechanism 18 is normally in continuous operation even though only during a small percentage of time is mechanism 18 actually performing its function of raising a ball 14.

For a description of the preferred embodiment of this invention, reference is also made to FIG. 2. Operating system 30 comprises a photocell 33 consisting of a light source 34 centrally located between and below rails 16 and a photo receptor 36 directly above so that returning ball 14 will interrupt the passage of light as it passes between source 34 and receptor 36. Photocell 33 would be located as seen in FIG. 1 just before ball 14 reaches continuous belt 22.

The output of photocell 33 goes to a transistor Tp whose output signal is fed to timers or clocks T1, T2 and T3. The outputs of timers T1 and T2 are connected to the input of timer T3 through a delay line DL and also to opto-isolator 38. Typically timer T1 will produce a signal upon actuation for 0.5 sec., while timer T2 will produce a signal for 3.5 secs. beginning when the signal from timer T1 terminates as conveyed through capacitor C1 as the result of the manner by which timers T1 and T2 are connected to each other. Timer T3 will produce a signal for about 0.2 sec. The signal to timer T3 coming from delay line DL acts as an inhibit signal. The purpose of these periods of time will be described below. Delay line DL includes a capacitor C2 and a bleeding resistor R1.

The outputs of timers T1 and T2 are also ORed through a pair of diodes D1 and D2, respectively, to opto-isolator 38 which passes its output through a triac 42 to RUN winding I1 in induction motor 32. Diodes D3, D4, D5 as well as diodes D1 and D2 prevent any reverse current flow.

The output of timer T3 goes to opto-isolator 44 which energizes triac 46 which activates START winding I2 in motor 32 through a capacitor C3. Motor 32 is powered from the A.C. source illustrated when triacs 42 and/or 46 are energized, as shown. The purpose of opto-isolators 38 and 44 is to isolate the low voltage and high voltage sides of the system.

From the arrangement just described, it is seen that RUN winding I1 is energized for a total of four seconds (the total sequential time of timers T1 and T2). Four seconds is the time determined to insure that a ball passing through photocell 33 has enough time to reach rack 12. Timer T3 fires for 0.2 sec., the time required to energize START winding I2.

It is understood that each of the timers which have been described are clocks which deliver signals for preselected periods of time, as is understood in the art.

In the operation of system 30, in its quiescent state (belt 22 inoperative), light from source 34 strikes photo acceptor 36 unimpeded. All timers T1, T2, and T3 are not active and this holds opto-isolators 38 and 44 off which in turn holds the triacs 42 and 46 off. The motor RUN and START windings, I1 and I2, respectively receive no current.

When a ball 14 comes down the chute it interrupts the light path from source 34 to photo receptor 36 causing transistor Tp to start conducting.

This results in a voltage drop at the collector of transistor Tp causing timer T1 to start running which will energize the run winding I1 and start to load up delay line DL, that is, charge up capacitor C2. At the same time, the firing of transistor Tp will initiate the operation of timer T3 which will energize the START winding I2 of motor 32. Timer T3 operates only for the length of time it takes to get motor 32 running and the period of time selected for timer T3 would depend on the characteristics of motor 32. A typical period of time, as already noted, would be 0.2 sec.

When timer T1 terminates, this causes by way of capacitor C1 timer T2 to begin running resulting in the RUN winding I2 of motor 32 to remain energized and keep the latter going. The signal being received and passed through by delay line DL to timer T3 acts as an inhibit signal and keeps timer T3 from being initiated. The purpose of the delay is not to interfere with the initiation of timer T3 by the signal directly from transistor Tp when starting from a quiescent state.

In the event no ball passes through photo cell 32 within four seconds after the first ball, timer T2 will stop running after 3.5 secs, delay line DL will bleed off the charge on its capacitor C2, and motor 32 will stop running.

However, should a second ball pass through photo cell 32 while timer T2 is still running, activation of transistor TP will cause timer T1 to refire (ie. start running) and timer T2 to be reset (that is, stop it from running and have it ready to start all over again when timer T1 terminates).

It should be noted that the mechanics of the ball handling system shown in FIG. 1 are such that no ball can follow closer than 1 sec. behind the preceding ball so that it is not possible for a successive ball to pass through photo cell 32 while timer T1 is running.

The outputs of timers T1 and T2 keep RUN winding I1 activated for a minimum of four seconds. If an additional ball arrives before the end of the four second period then timer T1 and timer T3 are retriggered in succession as previously described. This extends motor run time to four seconds after the last ball has arrived, at which time system 30 returns to its quiescent state provided no new ball arrives within the four seconds.

In the arangement which has been described it is understood that timer T3 delivers a timing signal of sufficient duration to effect the start of motor 32. The duration of the timing signals delivered by timers T1 and T2 in sucession is sufficient to cover the period of time for ball lift assembly 10 to carry a ball 14 arriving at lift mechanism 18 to its resting place on ball rack 12. The duration of the timing signal delivered by timer T1 is less than the spacing capabilities of lift mechanism 18, that is, less than the minimun period of time between balls that the apparatus is capable of handling. Typically, such apparatus could not lift balls at the rate of more than one a second. The shorter duration of the signal from timer T1 insures that any successive ball which arrives at photo detector 33 will occur while timer T2, rather than timer T1 is running, causing timer T1 to restart and timer T2 to be reset, that is, turned off and ready to be restarted when the signal from timer T1 terminates.

The advantages of the arrangement just described include the sharp reduction in power consumption. A system according to the preferred embodiment was installed and it was found that motor 32 ran only about one-third of the time with consequent sharp reduction in the amount of electric power consumed.

In addition, intermittent operation reduces motor and lift mechanism wear so that reduced repair and maintenance costs are to be expected with the use of this invention.

A further advantage of this invention is that the operation of the START winding I1 using a timer replaces the usual centrifugal clutch switch that normally controls it. Replacement of a mechanical part with a solid state timer increases its reliability.

While only certain preferred embodiments of this invention have been described it is understood that many variations are possible without departing from the principles of this invention as defined in the claims which follows.

What is claimed is:

1. In a ball lift mechanism for the ball return chute of a bowling alley having a continuous belt interconnecting a pair of pulleys for lifting each returning ball and an induction motor having a run winding and a start winding for driving said pulleys, the improvement comprising, means for detecting the approach of a returning ball and producing a trigger signal, first timer means activated by said trigger signal for producing a first timing signal, second timing means in response to termination of said first timing signal for producing a second timing signal, third timer means activated by said trigger signal for producing a third timing signal for a sufficient length of time to energize said start winding of said motor, means for delaying and delivering an inhibit signal to said third timer means in response to either of said first and second timing signals whereby said third timer means will remain inhibited for the period of time covered by the operation of said first and second timer means in succession after said start winding is energized, said first and second timing means being reactivated in succession upon a second ball being detected by said light sensitive means prior to terminating of the output signal of said second timing means thereby continuing the delivery of said inhibit signal, and means in response to the presence of a first or second timing signal for energizing said running winding of said motor.

2. The ball lifting mechanism of claim 1 in which the duration of said first timing signal is shorter than the minimum ball spacing handling ability of said mechanism.

3. The ball lifting mechanism of claim 2 in which the duration of said first and second timing signals in succession is sufficient to cover the length of time it takes for said ball lift mechanism to lift a ball.

4. The ball lifting mechanism of claim 3 in which said means for energizing the start and run windings of said motor comprises triacs.

5. The ball lift mechanism of claim 4 having opto-isolator means to isolate said triacs from said timer means.

6. The ball lifting mechanism of claim 5 in which said detecting means comprises a light sensitive device.

7. The method of controlling the operation of a returning ball lift mechanism in a bowling alley, said mechanism energized by an induction motor having a run winding and a start winding, comprising the steps of producing a signal detecting the approach of a returning ball, simultaneously energizing the run and start windings of said motor with timed signals, inhibiting the operation of said start winding after a finite period of time while said start winding is energized, and renewing the timed signal to said run winding upon a second returning ball being detected before the timed signal to said run winding terminates and thereby causing the continued inhibition of said start winding.

8. The method of claim 7 wherein said run winding is energized by first and second timed operating signals in succession.

9. The method of claim 8 wherein the first timed operating signal is shorter than the minimum ball spacing handling ability of said ball lift mechanism.

10. The method of claim 8 wherein the elapsed time of said first and second timed operating signals is sufficient to cover the length of time it takes for said ball lift mechanism to lift a ball.

* * * * *